United States Patent [19]

Gillissen

[11] 3,889,239

[45] June 10, 1975

[54] SELECTIVE STORAGE SYSTEMS

[75] Inventor: Johannes Jacobus Gillissen, Leimuiden, Netherlands

[73] Assignee: Societe Honeywell Bull (Societe Anonyme), Paris, France

[22] Filed: Feb. 13, 1973

[21] Appl. No.: 331,742

[30] Foreign Application Priority Data

Feb. 16, 1972 France ..........................05210/72

[52] U.S. Cl. ....... 340/172.5; 178/6.8; 178/DIG. 24; 340/173 RC; 340/173 GR

[51] Int. Cl..... G11c 11/32; G11c 21/00; H04n 5/80

[58] Field of Search.... 340/172.5, 173 CR, 173 RC; 178/6.8, 7.3 D, DIG. 024

[56] References Cited

UNITED STATES PATENTS

| | | | |
|---|---|---|---|
| 2,767,908 | 10/1956 | Thomas | 340/172.5 |
| 2,777,634 | 1/1957 | Williams et al. | 340/172.5 |
| 2,807,005 | 9/1957 | Weidenhammer | 340/172.5 |
| 2,923,469 | 2/1960 | Woodbury | 340/172.5 |
| 2,954,427 | 9/1960 | Covely et al. | 178/DIG. 024 |
| 2,960,566 | 11/1960 | Athey | 178/DIG. 024 |

*Primary Examiner*—Gareth D. Shaw
*Assistant Examiner*—James D. Thomas
*Attorney, Agent, or Firm*—Fred Jacob

[57] ABSTRACT

A system for the selective storing of information of any duration, including associated temporary stores, is provided.

The system comprises at least two identical elements for temporary storing, each of the elements comprising a memory for optical line-at-a-time reading, and a television camera, each camera being, on one hand, arranged in front of the display panel of the associated memory for line-at-a-time reading of the information stored in said memory and, on the other hand, electrically linked to the memory of another element for writing at least one information line into said memory.

5 Claims, 4 Drawing Figures

SELECTIVE STORAGE SYSTEMS

BACKGROUND OF THE INVENTION

The present invention has for an object a selective system of information storage of any duration, including associated temporary stores.

Random-access memories have data-recording media consisting of sections, in regular intervals, for entering sub-sets of information. These sub-sets are separately accessible according to the position, or the address, of the section under consideration. These memories often must have a large data-storing capacity as well as capablity for a relatively brief time of access to the data. Magnetic memories are used in this manner at the present time, especially drums and disks. The recording of the data subsets is accomplished on tracks by means of these memories. The drums offer the advantage of providing an access time to each track on the order of 10 ms, which is markedly lower than the time needed for disks (on the order of 100 ms). On the contrary, however, the storage capacity of disks, on the order of 10 million characters, is significantly higher that that of the drums. Thus, there is no decisive advantage in prefering one technical solution over the other.

On the other hand, a substantial reduction of the access time to these stores can hardly be visualized. In fact, access to the data recorded in magnetic memories is achieved by the installation of magnetic heads on the tracks, and by a rotation of the recording medium. This is effected by a mechanical device whose inertia limits the possible speeds, and is not conducive to foreseeing a spectacular improvement of the already attained outputs.

Cathode-ray tubes with grid storage may also form random-access memories. These tubes make it possible to store data for a long time, even without a feed voltage. In this case, entering of the data is effected on lines of the display panel, and reading of each line at a time may be done optically. It is conceivable that relatively brief access times may be obtained by an electronic control of the optical reading. On the other hand, the storage capacity of the screens of the known tubes is not sufficient for mass storage. Also the remanence of the tube screen restricts the storage time to a few weeks.

The object of the present invention is the design of selective storage media of large capacity with brief access times, similar to those of drums, which maintain the storage for a period independent of the remanence of the tube.

SUMMARY OF THE INVENTION

The objective of the present invention concerns a system of selective data storage of any duration, with associated temporary stores characterized in that it includes at least two identical elements for temporary storing, each of them consisting of a memory for optical line-at-a-time reading and of a television camera, each camera being, on the one hand, positioned in front of the display panel of the associated memory for line-at-a-time reading of the information stored in that memory and, on the other hand, electrically linked to the memory of another element for writing at least one information line in said memory.

BRIEF DESCRIPTION OF THE DRAWING

Other characteristics and advantages of the invention will evolve from the description which is presented for nonlimiting exemplary purposes, and with reference to the accompanying drawing, wherein.

DESCRIPTION OF THE PREFERRED EMBODIMENT

In the following description, the temporary memories for optical reading are cathode-ray tubes with grid storage used as television tubes, fed in Z modulation with digital data, for entering one line-at-a-time of information on their screen, to be read one line-at-a-time by television cameras.

Figure 1:
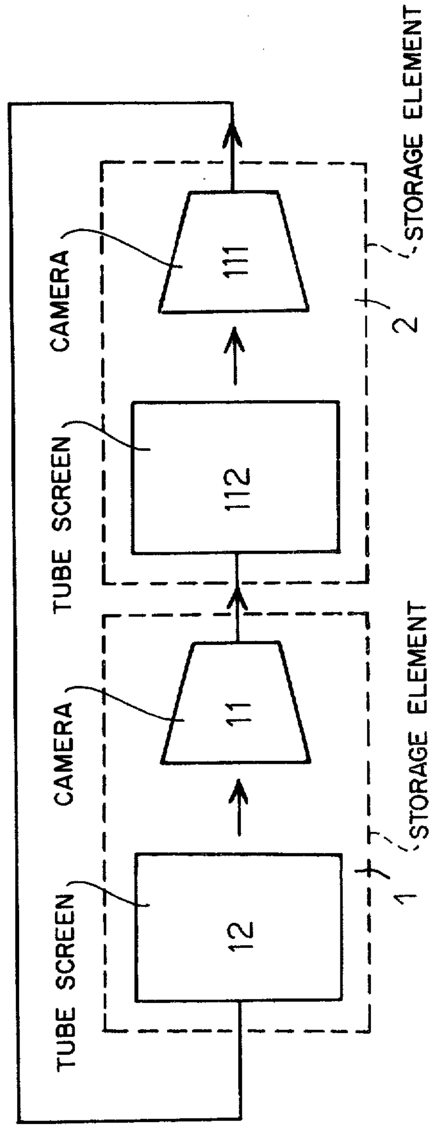
FIG. 1 is a schematic diagram of the storage system for a data set, according to the invention.

The system of FIG. 1 includes two storage elements 1 and 2, the first consisting of a tube 12 and of a camera 11, and the second of a tube 112 and a camera 111. The tubes 12 and 112 may be Hewlett Packard Oscillo 181A mesh storage cathode ray tubes. The photosensitive front of the camera 11 is positioned facing the screen of the tube 12 and is also linked to the tube 112 of the element 2 for entering onto the screen of this tube data read by the camera 11 from the screen of tube 12. In the same way, the camera 111, facing the screen of tube 112, permits the entering of information read from the screen of tube 12 onto the screen of tube 112. By means of a suitable control, linked for example with a switching circuit installed between the camera of the one element and the tube of the other element, the storage of the information in tube 12 may be maintained for a time arbitrarily selected and independent of the storage time characteristics of that tube.

It is apparently possible to accomplish a permanent storage in one of the tubes, of at least one line of information previously entered in one of the tubes with cameras, making possible the reading of a line at a time and of gaining random access to one line of information entered on the screen of a tube, by a suitable connection in the output of the camera facing this tube.

Figure 2:
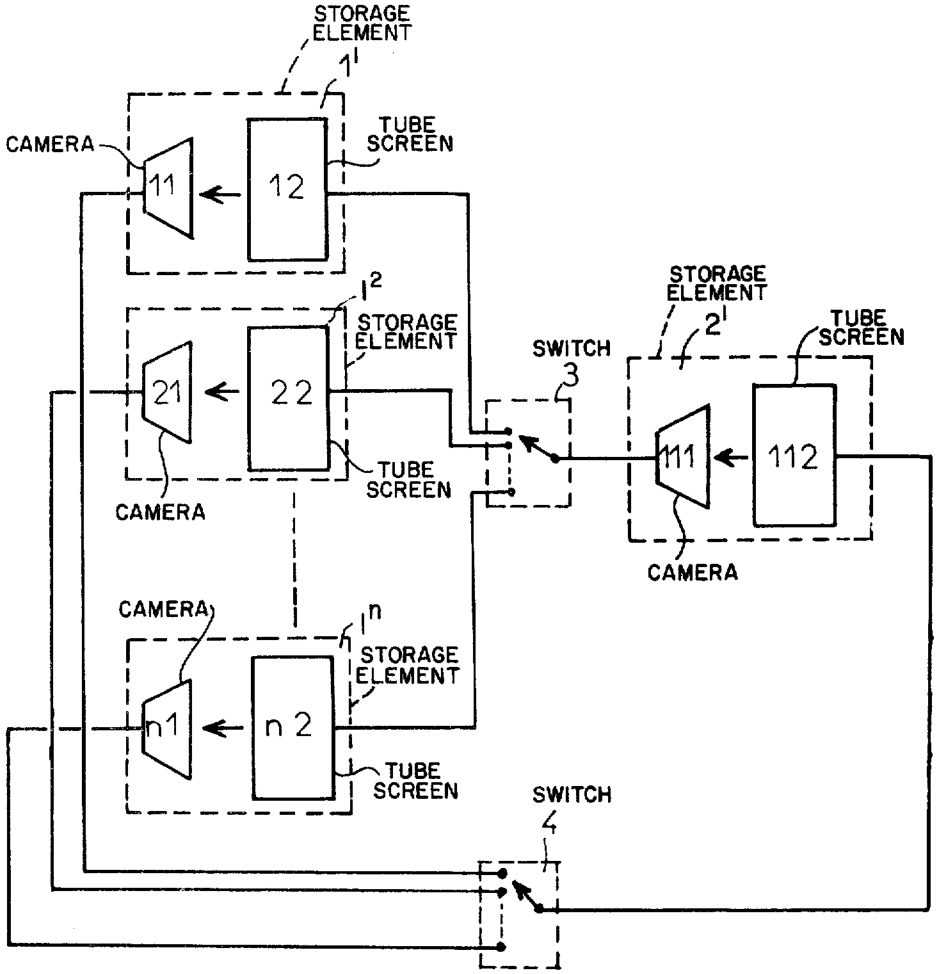
FIG. 2 is another schematic diagram of the system with $(n + 1)$ storage elements of various data sets, which sets at the maximum equal $n$, according to the invention.

Another association of the storage elements is illustrated in FIG. 2 where $n$ elements $\mathbf{1}^1, \mathbf{1}^2 \ldots \mathbf{1}^n$ consist of the cameras 11, 21 . . . $n$1 facing the tube screens 12, 22 . . . $m^2$, respectively. The $(n + 1)$ th element 21 comprises the camera 111 whose photosensitive front faces the screen of tube 112. The switch 3 allows one to connect one of the tubes 12, 22 . . . $n^2$ with the camera 111, while the switch 4 allows the connection of one of the cameras 11, 21 . . . $n$1 with the tube 112. The $n$ first elements being independent of each other the element $(n + 1)$ makes possible the storage of, at the maximum, $n$ data sets for arbitrarily chosen periods and to extract at least one sub-set of information from one of these sets by suitable control circuits, for the entering, the clearing and the reading of one or several lines of the screen of a tube.

Figure 3:
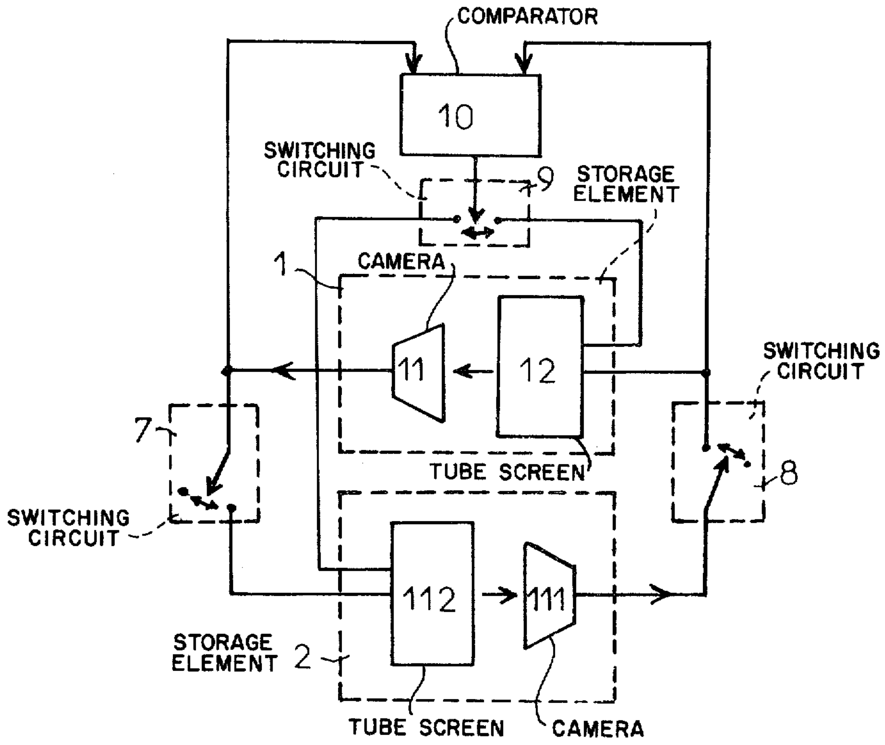
FIG. 3 is an example of an embodiment of the system with two storage elements equipped with a control circuit, according to the invention.

So as to be certain of the accuracy of the information read on the screen of a first tube and entered onto the screen of a second tube, before the possible clearing of the data on the screen of the first tube, it is preferable to provide a control circuit in the storage system. Thus, in FIG. 3 the storage elements 1 and 2 include the camera 111 and the tube 12, and the camera 11 and the tube 112, respectively. The connection of the camera 11 with the tube 112 is effected by the switching circuit 7 and the connection of the camera 111 with the tube 12 by the circuit breaker 8. The switching circuit 9 makes possible the clearance of information from the screen of tube 12 or from the screen of tube 112.

This switching circuit 9 is controlled by a comparator 10 whose two inputs are linked to the outputs of the cameras 11 and 111, respectively. Thus, data read from tube 12 by the camera 11 is entered in tube 112 by the intermediary of the switching circuit 7. The information entered in the tube 112 is then read by the camera 111. The information read by the two cameras is transmitted to and compared by the comparator 10. If they are identical the switching circuit 9, positioned at the output of the comparator, permits the clearing of the recording from tube 12 before a new entry of the information from tube 112 into the tube 12 by means of the camera 111 and the switching circuit 8. The data entered in the two tubes is then again compared and cleared from tube 112 if the information entered in tube 12 is identical. During the two mentioned comparisons the switching circuit 9 permits the clearing of the information in the last tube in which it was entered, if the data is not identical. It is quite obvious that this control medium may be applied to more than two storage elements and may be effected, in the case of a selective storage, in one or several tubes since this is a line-at-a-time control.

Figure 4:
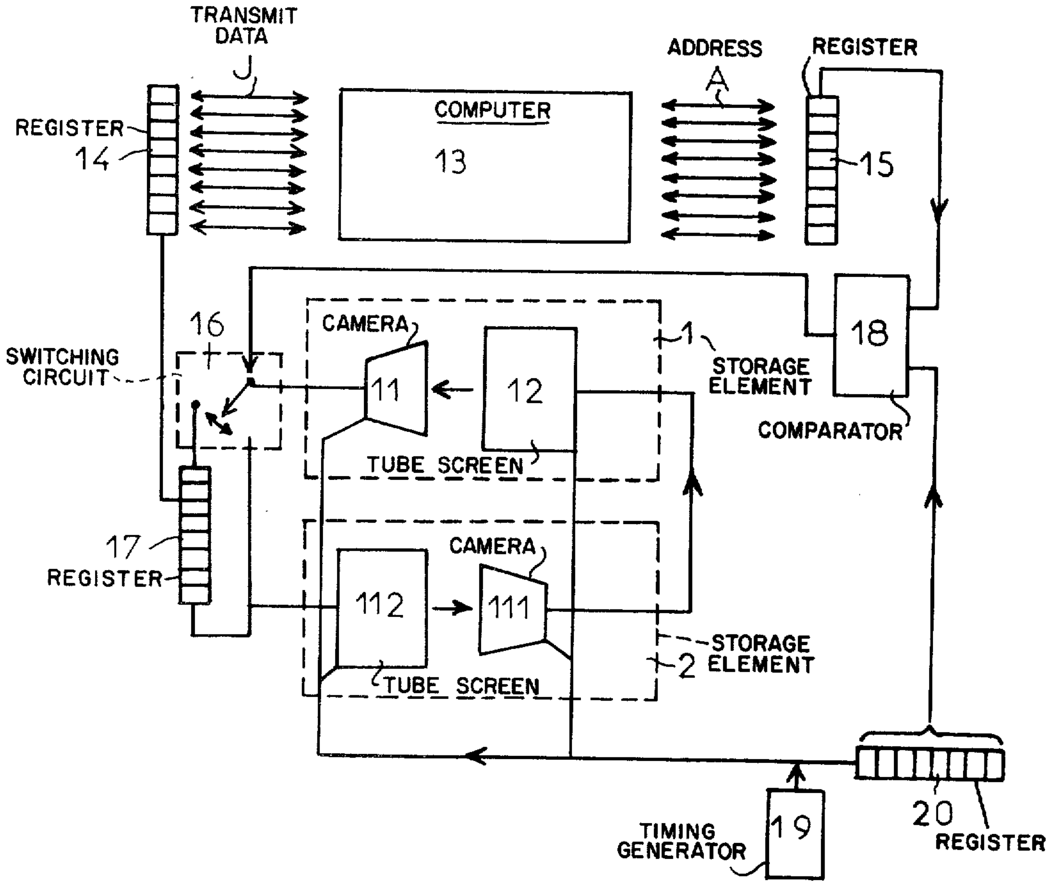
FIG. 4 is an example of an embodiment of the system with two storage elements linked to a computer, according to the invention.

FIG. 4 is a general diagram of a particular embodiment of a system with two storage elements 1 and 2 linked with a computer 13, from which the system may receive and to which it may transmit data J by means of a register 14, and the address A of the data by means of a register 15. The two elements 1 and 2 include the camera 11 and the tube 12, and the camera 111 and the tube 112, respectively. The switching circuit 16 mounted between the camera 11 and the tube 112 makes it possible either to enter into tube 112 information read by the camera 11, to clear information already entered in that tube, or to enter new information originating in the computer by means of a register 17 linking the switching circuit 16 with the tube 112. This register 17 also allows transmission to the computer of information read by the camera 11 from tube 12. For that purpose the switching circuit 16 is connected with the register 17 by the control of the comparator 18. A basic timing generator 19 provides for the synchronization of the cameras 11 and 111 and the tubes 12 and 112 and at the same time permits the computing of the address of the line of information read by the camera 11. When the comparator 18 receives at its two inputs the address of the read line transmitted by the register 20 and an address identical with the line of information for transmission to the computer, the switching circuit 16 is linked with the register 17 for the transmission of the line of information from the camera 11 to the computer 13.

The preceding detailed description refers to a special example of embodiment of the storage system according to the invention comprising two storage elements. It is clear that the number of elements depends on the amount of data to be stored, that the definition of the write-read cycles between two elements depends on the storage times chosen and that the connections of the elements with the computer depend on the information to be exchanged with it and on the address of this information. One should especially note that a design such as that of FIG. 4 allows the clearing of one or several lines of stored information and the reentering of new information on the same lines. On the other hand, the combining of elements in a number that may reach one hundred does not necessarily require an increase of the logical circuits of the system. It will be seen that, for reasons of greater accuracy, it is better not to enter the recording on the border of the screens, so as to prevent any possibility of error in the optical reading of the cameras, and to provide a correction circuit associated with each camera for the elimination of all alignment errors as well as for an efficient reading of the desired line.

For exemplary reasons the storage system according to the invention is best used as a random-access memory by combining 100 elements comprising TV tubes of 625 lines which represent approximately a storage capacity of 9 million characters, with an access time of about 20 ms for 150 characters. The simplicity of the circuits results in a low cost for the price of storage per information unit as compared to that of known magnetic memories.

The storage may be maintained for a very long time with tubes storing the data for several days without a power supply. The space requirement of the feed circuits may also be reduced by providing a power supply common to all tubes being used.

Additionally, cathode-ray tubes with grid storage represent relatively inexpensive memories for optical reading, yet the development of flat screens and display panels also allows one to visualize other particularly important applications of the present invention. Such is the case with liquid crystal memories, those with electroluminescent diodes whose space requirement is greatly reduced and whose access time is very brief. The use of deflector tubes for laser beams, requiring very little space also represents a particularly important application of magneto-optical memories, in view of the increased storage capacities and the very short access times which are on the order of a few microseconds.

What is claimed is:

1. In a data storage system, the combination of:

at least a pair of data storage assemblies forming a data storage loop, each assembly including a data storage member inherently possessing only a limited storage time capability and having a face at which an array of stored data is displayed, and a television camera focussed on said face optically to read selected data of said array;

means connecting the television camera of one assembly to the data storage member of the other assembly for transferring said selected data read by the television camera of said one assembly to the data storage member of said other assembly; and means connecting the television camera of said other assembly to the data storage member of said one assembly for transferring said selected data back to said data storage member of said one assembly whereby periodically to re-store data in said data storage member of said one assembly within said limited storage time capability thereof.

2. In a data storage system as defined in claim 1 including a plurality of further data storage assemblies in parallel with said one data storage assembly, said means first mentioned including switch means for selectively connecting said data storage member of said other assembly to any one of the television cameras of the said one and further assemblies and said means last mentioned including switch means for connecting the television camera of said other assembly to any one of the data storage members of said one and further assemblies.

3. In a data storage system as defined in claim 1 wherein said means first mentioned includes first switch means for selectively connecting said data storage member of said other assembly to the television camera of said one assembly and said means last mentioned includes second switch means for selectively connecting said television camera of said other assembly to the data storage member of said one assembly, and including comparator means connected through said second switch means to the television camera of said other assembly and to the television camera of said one assembly for selectively erasing data from either data storage member.

4. In a data storage system as defined in claim 1 including a first data register connected to said data storage member of said other assembly, clock means for providing synchronization between said data storage assemblies, a first address register connected to said clock means for recording the line being addressed by said camers, a second address register containing a selected address, comparator means connected to said first and second address registers for providing an output when the addresses of said first and second address registers are the same, and said means connecting the television camera of one assembly to the data storage member of the other assembly comprising switch means controlled by the output of said comparator means for connecting said television camera of said one assembly to the data storage member of said other assembly in the absence of said output of the comparator means and for loading said data register from said television camera of said one assembly in the presence of said output of the comparator means.

5. In a data storage system as defined in claim 4 including a second data register, said first and second data register being connected to transfer data from said first to said second date register.

* * * * *